June 29, 1965 J. L. WATERS 3,191,425
MEASUREMENT OF THE CONCENTRATION OF A PARAMAGNETIC
GAS IN A GASEOUS MIXTURE
Filed Aug. 21, 1961 3 Sheets-Sheet 1
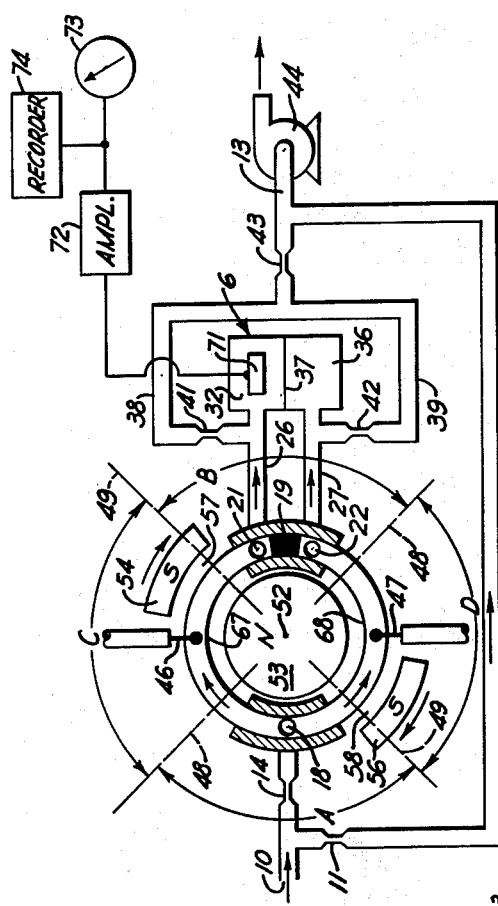
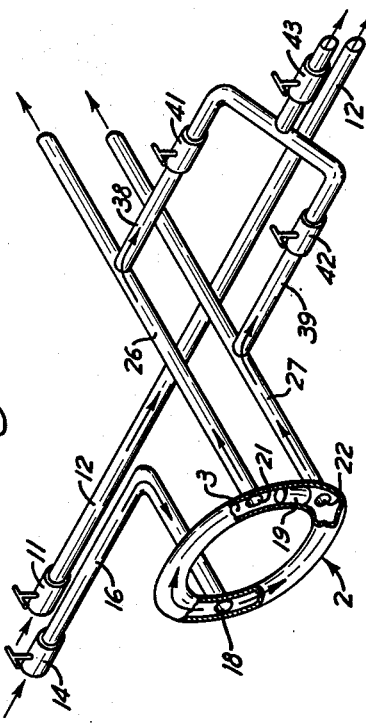
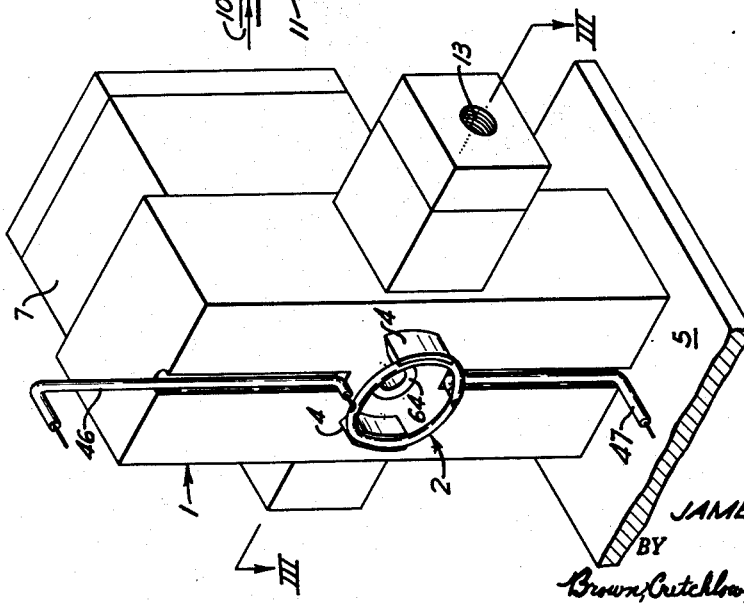
INVENTOR.
JAMES L. WATERS
BY
Brown, Critchlow, Flick & Peckham
ATTORNEYS

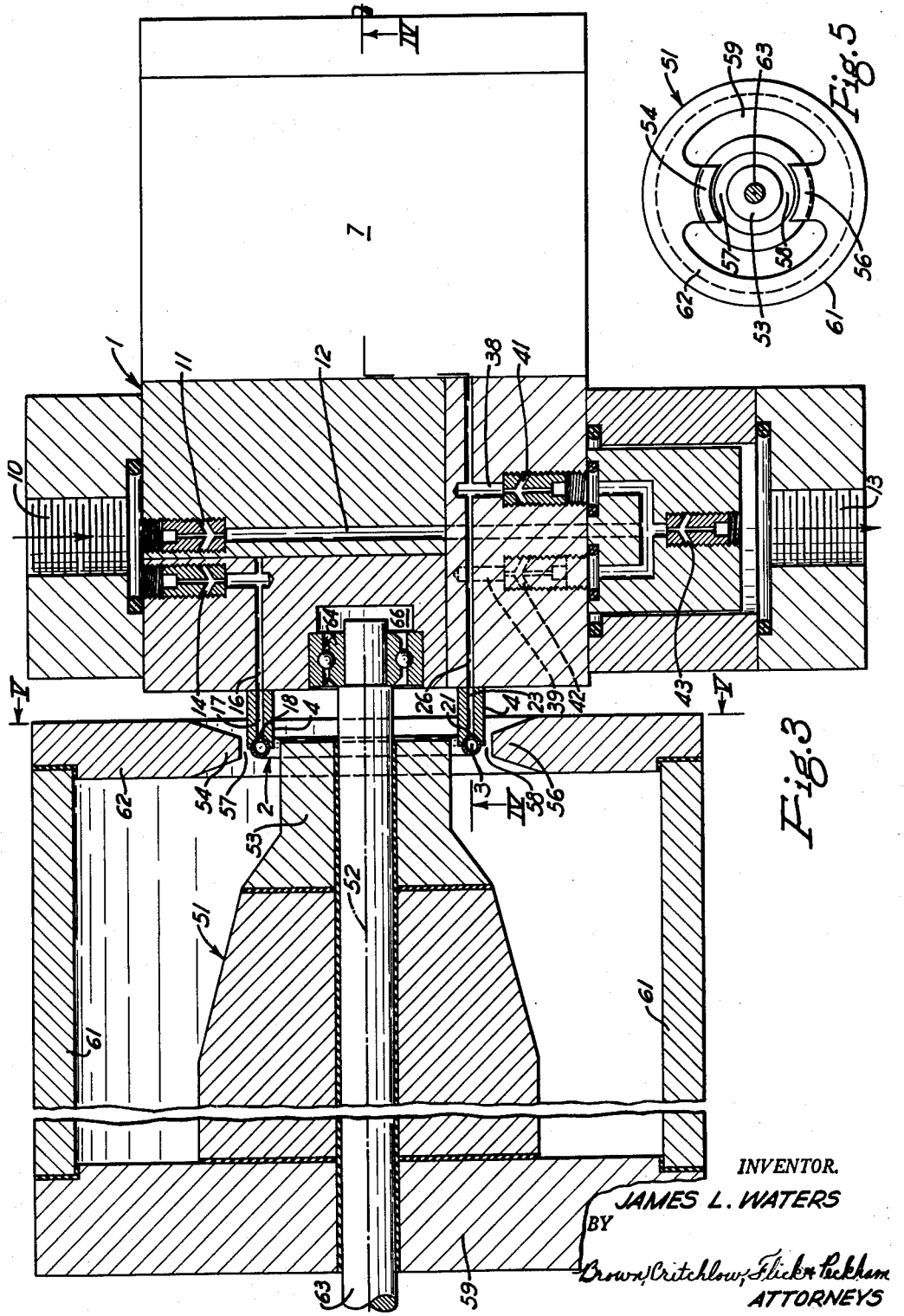

ns patentUnited States Patent Office 3,191,425
Patented June 29, 1965

3,191,425
MEASUREMENT OF THE CONCENTRATION OF A PARAMAGNETIC GAS IN A GASEOUS MIXTURE
James L. Waters, Framingham, Mass., assignor to Mine Safety Appliances Company, Pittsburgh, Pa.
Filed Aug. 21, 1961, Ser. No. 132,653
9 Claims. (Cl. 73—23)

This invention relates to the measurement of the concentration of a paramagnetic gas, in particular oxygen, in a gaseous mixture. The invention is an improvement of that disclosed in Luft Patent No. 2,696,731, issued December 4, 1954, and is predicated on the same general phenomena set forth in that patent.

Luft's paramagnetic gas analyzer is based on the principle that the force attracting a paramagnetic gas, such as oxygen, into a magnetic field is proportional to the number of molecules of oxygen and inversely proportional to the square of the absolute temperature of the gas. In his apparatus, two adjacent portions of the gaseous mixture that have different magnetic susceptibilities (produced either by locally heating the mixture or by two different mixtures that are to be compared) are subjected to a periodically varying magnetic field of non-uniform distribution, thereby creating pressure pulses that are detected and measured by a condenser microphone. Luft varies his magnetic field either (1) by varying its intensity across a fixed air gap (specifically, by varying the reluctance in another portion of the magnetic circuit) or (2) by rotating a portion of the magnetic field (specifically, by rotating one of the magnetic pole pieces having two portions of different magnetic characteristics asymmetrically disposed about the axis of rotation, the axis of rotation being generally parallel to the lines of magnetic force between the ends of the pole pieces).

It is among the objects of the present invention to provide a paramagnetic gas analyzer of the pressure pulse type, in which a plurality of different temperature gas junctions and magnetic fields are so disposed that the analyzer is substantially more sensitive than former analyzers of this type, and in which improved means are provided for locally heating the gaseous mixture to produce the desired temperature differences in the paramagnetic constituent.

Other objects of the present invention will be apparent from the following description of a preferred embodiment, in connection with the attached drawings, in which:

FIG. 1 represents a schematic view of the paramagnetic gas analyzer of this invention;

FIG. 2 is an isometric view of the flow block and detector portions of the assembled analyzer, with the revolving permanent magnet omitted for purposes of clarity;

FIG. 3 is a horizontal section of the flow block along the lines III—III of FIG. 2 and adjacent parallel planes, showing various gas passages in the block, and showing also a horizontal section of the rotating permanent magnet;

FIG. 5 is an end elevation, in reduced scale, of the permanent magnet along the line V—V of FIG. 3; and FIG. 6 is a diagrammatic view of the various gas passages in the flow block.

Figure 4:
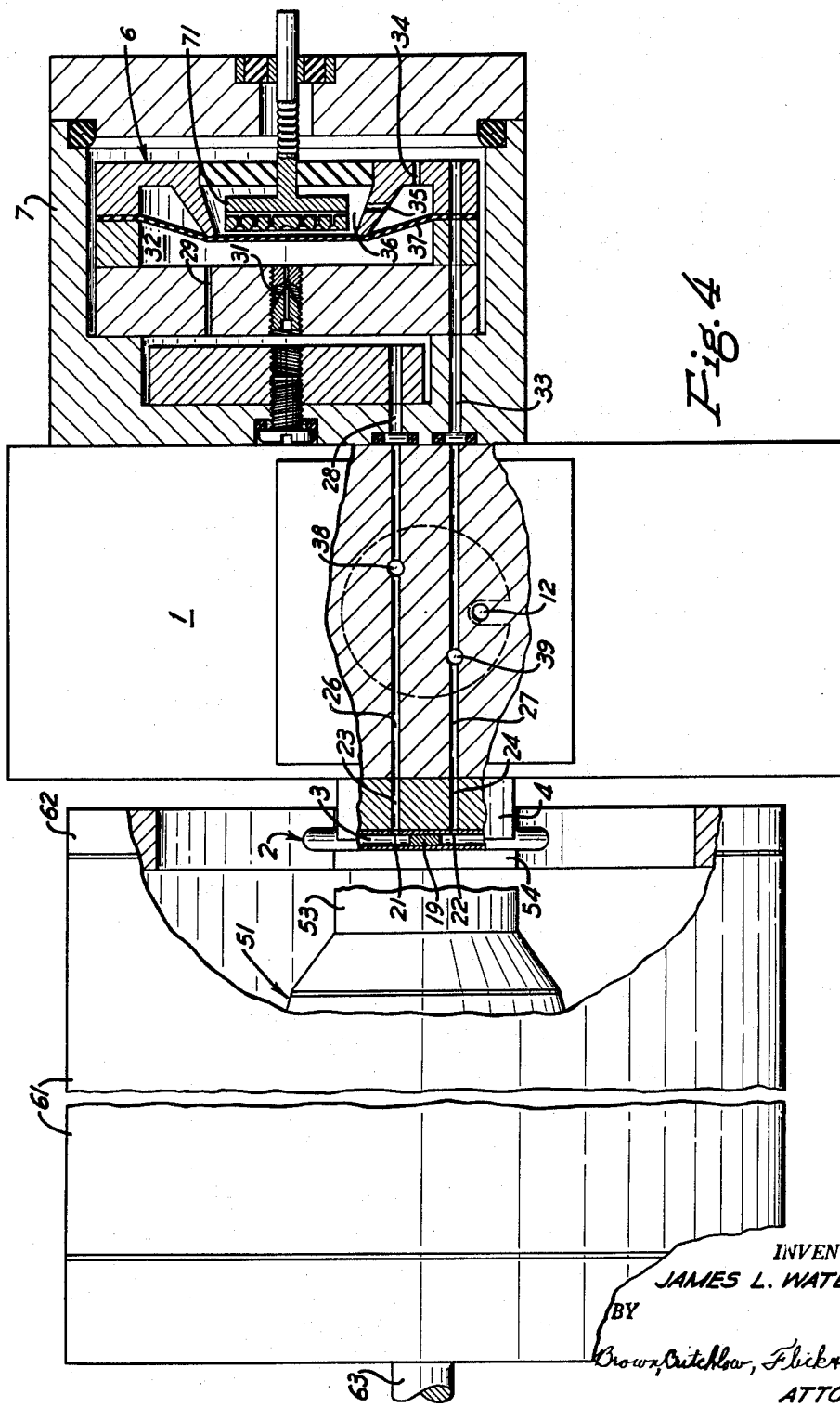
FIG. 4 is a side elevation, partly in section, of the flow block, showing some of the gas passages therein, together with a vertical section of the detector, along the line IV—IV of FIG. 3.

In accordance with this invention for measuring the concentration of a paramagnetic gas in a gaseous mixture, means are provided for producing two substantially identical magnetic fields of non-uniform distribution across a pair of spaced air gaps that are symmetrically disposed about a given axis, about which the air gaps and their associated magnetic fields are rotated, the gas sample to be analyzed flows through arcuate gas flow paths on opposite sides of said axis and symmetrical therewith along the path of the rotating air gaps. A portion of each flow path is locally heated and is bounded by adjacent cool zones to provide two temperature differential junctions in each flow path, the junctions in one flow path being diametrically opposed to the corresponding junctions in the other flow path. As the magnetic fields rotate, the magnetic flux across the air gaps periodically passes through a temperature differential junction in one flow path and at the same time through the corresponding junction in the other flow path to produce two essentially simultaneous pressure pulses of approximately equal magnitudes. These pressure pulses are transmitted to a condenser microphone in such a way as to create a pressure differential across the diaphragm of the condenser microphone that will generate an electrical signal proportional to the sum of the magnitudes of the pressure pulses.

Referring to the drawings, the general elements of the analyzer include a flow block 1, in which are drilled various gas passages and on the front face of which is mounted an analyzing tube in the form of a ring 2 having a small bore 3. This ring is directly supported on the block 1 by a pair of thermally and electrically conductive supports 4, which are symmetrically disposed on opposite sides of the ring and also contain gas flow passages connecting the bore of the ring with certain passages in the flow block. The flow block and the ring supports 4 are preferably made of stainless steel. The flow block may be supported on a base 5, and a condenser microphone 6 is mounted on the back of the flow block in a housing 7 and communicates through gas passages with the bore of the ring. The gaseous mixture enters the analyzer through an inlet 10 on one side of the flow block, and the main portion of the gas stream flows directly through the block via an adjustable orifice 11 in a bypass passage 12 to an outlet 13. The sample gas to be analyzed passes from the inlet 10 through an adjustable orifice 14, a passage 16 in the block, and an inlet passage 17 in the first support 4 to an inlet 18 in the wall of the ring. Diametrically opposite inlet 18 is a partition or plug 19 across the inside of the ring. On either side of the partition and closely adjacent thereto are separate gas outlets 21 and 22, leading respectively to outlet passages 23 and 24 in the end support 4 and passages 26 and 27 in a flow block 1. The latter passages, in turn, communicate with the condenser microphone 6, as follows: gas flows from passage 26 into a passage 28 in the detector housing 7 and then through a small bore passage 29 and, in parallel therewith, through an adjustable orifice 31 to chamber 32 in the condenser microphone; and gas flows from passage 27 through passages 33, 34 and 35 into chamber 36, which is on the opposite side of the condenser diaphragm 37 from chamber 32. Outlet passages 23 and 24 are also connected through passages 26 and 27 and passages 38 and 39 (with their adjustable orifices 41 and 42), respectively, to a common orifice 43 and then to the main gas outlet 13. A suction pump 44 (see FIG. 1) connected to outlet 13 is driven by a motor (not shown) draws the gas mixture through the apparatus from the main inlet 10 to the main outlet 13 along the paths described.

The analyzer tube or ring 2 is preferably made of metal having a high electrical resistance, such as Nichrome or stainless steel, and is mounted in good thermal and electrical contact on the supports 4, as by silver soldering. The ring is heated electrically by conductors 46 and 47, which are connected to a source of electrical power (not shown) and to the ring at diametrically opposite site points midway between the inlet 18 and partition 19. When electric current flows through the ring, it is heated but not appreciably so in those areas that are in electrical and thermal contact with the supports 4. These supports not only electrically short out those portions of the ring that they contact and thereby limit the resistive heating of the ring to localized diametrically opposite areas, but they also act, in conjunction with flow block 1, as a heat sink, conducting the heat away from the ring over their area of contact with the ring and immediately adjacent areas. The net result of the foregoing arrangement is that the ring is divided approximately into two symmetrically opposed "cold" quadrants A and B, one adjacent the inlet 18 and the other adjacent the outlets 21 and 22, and into two symmetrically opposed "hot" quadrants C and D between the cold ones. At the junctions of any two adjacent quadrants, there is either a "cold-hot" junction 48 where the rotating magnetic fields discussed below pass from a cold to a hot region, or a "hot-cold" junction 49 where the magnetic fields pass from a hot to a cold region. There is a junction of each type in each of the symmetrical arcuate gas flow paths of ring 2; and each junction is diametricaly opposite to the corresponding junction in the other flow path.

The sample gas mixture flowing in ring 2 is subjected to a periodically varying magnetic field of non-uniform distribution by rotating a permanent magnet 51 about an axis 52 that passes through the center of the ring and is perpendicular to the general plane of the ring. The magnet includes a central pole piece 53 at one end, which may be arbitrarily designated as the north pole and two diametrically opposed south pole pieces 54 and 56 on either side of the north pole piece, providing two opposed air gaps 57 and 58. The magnetic circuit is completed by a bottom disc 59, a cylindrical side member 61, and a cap 62, of which the south pole pieces 54 and 56 are an integral part. The magnet is mounted on a shaft 63, which is rotatably supported at one end in bearings 64 in a bore 66 in the front face of the flow block 1, and the axis of this shaft is coincident with axis 52 passing through the center of ring 2. The other end of the shaft is supported on base 5 by suitable bearings and supports (not shown) and connected to a synchronous electric motor through appropriate gearing (neither of which is shown) that will rotate the shaft approximately one revolution per second. The magnet is supported so that the bore of ring 2 is in the center of the air gaps 57 and 58 in all of the rotated positions of those gaps. It will be apparent from the design of this magnet and its pole pieces that a very strong magnetic flux will be concentrated across the relatively small air gaps, so that the gas mixture flowing inside the ring will be subjected to a strong magnetic field. When the pole pieces are rotated, the magnetic fields and the air gaps will also rotate and subject the gas mixture in the ring to periodically varying magnetic fields of non-uniform distribution.

The gas sample to be analyzed, for example, for oxygen content, flows into the bore of ring 2 from inlet 18 in the center of "cold" quadrant A. The sample splits into two substantially equal streams, one stream flowing through the upper branch of flow path 67 of the ring to outlet 21, and the other stream through the lower branch or flow path 68 through outlet 22, both outlets being symmetrical and closely adjacent to the center of "cold" quadrant B. As the magnet rotates in a clockwise direction, looking at FIG. 1, one of the magnetic fields, say that across the first air gap 57, will traverse the "cold-hot" junction 48 in flow path 67. When it does so, the adjacent "cold" oxygen molecules to the left of the junction will be attracted into the strongest part of the magnetic field in preference to the "hot" oxygen molecules to the right of that junction. The effect of this momentary preferential attraction of one portion of the gas at the junction is to create a pressure pulse in the upper flow path 67 in a clockwise direction. At the same time, the magnetic field across the second air gap 58 will be crossing the corresponding "cold-hot" junction 48 in the lower flow path 68 through the ring. Here the "cold" oxygen molecules are to the right of the junction and the "hot" molecules to the left. Consequently, the pressure pulse generated in this branch of the ring will also be in a clockwise direction and of substantially equal magnitude. As the magnet continues to rotate, the magnetic field across the first air gap 57 will next cross junction 49, which is a "hot-cold" junction, in the upper flow path 67; and the resulting pressure pulse will be in a counter-clockwise direction, from right to left. At the same time, the magnetic field across the second air gap 58 will be crossing the "hot-cold" junction 49 in the lower flow path 68 and will attract oxygen molecules preferentially from the cold region to the left of that junction, thereby also creating a counter-clockwise pressure pulse of substantially equal magnitude.

The foregoing alternating clockwise and counter-clockwise pressure pulses, and those that sequentially follow as the magnet continues to rotate, are transmitted through outlets 21 and 22 and their connected passages to the condenser microphone 6. Clockwise pressure pulses generated in ring 2 tend to increase the pressure in chamber 32 of the condenser microphone relative to the pressure in chamber 36 and may be referred to as "positive" pressure pulses. They tend to displace the diaphragm 37 downward (looking at FIG. 1), or to the right (looking at FIG. 4). On the other hand, counter-clockwise pressure pulses generated in ring 2 tend to increase the pressure in chamber 36 relative to chamber 32 and may be referred to as "negative" pressure pulses. They tend to displace the diaphragm 37 in the opposite direction. Since there are two pressure pulses generated simultaneously in the two branches of ring 2 each time the magnetic fields cross "cold-hot" or "hot-cold" and since both pulses are in the same direction (either clockwise or counter-clockwise), the simultaneous pulses are in phase and reinforce each other in deflecting the condenser diaphragm 37. As a result, there is a greater deflection of that diaphragm, and therefore greater sensitivity, in the presence of a paramagnetic gas such as oxygen, than if only single pressure pulses were generated, as in the Luft apparatus previously referred to.

The alternate displacements of the diaphragm 37 to the right and left (see FIG. 4) relative to the stator 71 (which is insulated from the rest of the detector body) produce a signal in an electrical circuit that is amplified by an amplifier 72 and transmitted to a meter 73 and, if desired, to a recording device 74, all of which are conventional and need not be explained further.

The various adjustable orifices in the gas flow passages are used, among other purposes, to obtain substantially equal flow of gas in the flow paths of ring 2 and to equalize substantially the resistances to gas flow in the passages leading from ring 2 to each side of the condenser diaphragm 37.

It is among the advantages of this invention that the rotating magnetic fields and the temperature differential junctions of the gas streams are so disposed that pressure pulses are generated and reinforce each other to improve the sensitivity of the instrument, making it approximately twice as sensitive as the Luft analyzer. Moreover, the pole pieces of the permanent magnet are so designed that a very strong magnetic field is concentrated across the air gaps, making the most effective use of the available magnetic flux. In addition, the use of a metal tube having a high electrical resistance not only to define the flow paths of the gas streams through the moving air gaps but also, in conjunction with the electrical and thermal properties of the supports for the ring tube, to locally heat and cool separate portions of the gas streams in the tube, present advantages not obtained with localized heating by means of resistance wire wrapped around an electrically non-conducting tube.

A "temperature differential junction" as that term is used in the appended claims refers to either a "cold-hot" junction of a "hot-cold" junction, as described herein, in which the sequence of the words "hot" and "cold" corresponds to the actual temperature gradient along the glas flow path in the direction traversed by the rotating air gaps and their associated magnetic fields. For example, in FIG. 1, junction 48 in flow path 67 is a "cold-hot" junction because the air gaps and their associated magnetic fields, assumed to be rotating in a clockwise direction, cross this junction from a "cold" region to a "hot" region. Similarly, because its temperature gradient is in the opposite direction, junction 49 in the same gas flow path 67 is a "hot-cold" junction. In addition, one junction that is described as "corresponding" to another refers to a junction in which the temperature gradient (i.e., from cold to hot or from hot to cold in the direction of rotation of the air gaps and their associated magnetic fields) is the same as the temperature gradient of the other junction to which it is said to correspond. For example, the two diametrically opposed junctions 48, one in gas flow path 67 and the other in gas flow path 68, are corresponding temperature differential junctions, because their temperature gradients (cold-hot) are the same in the direction traversed by the rotating air gaps and their associated magnetic fields. Similarly, diametrically opposed junctions 49 are also corresponding junctions.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for measuring the concentration of a paramagnetic gas in a gaseous mixture comprising means for producing substantially identical magnetic fields of non-uniform distribution across two spaced air gaps symmetrically disposed about a given axis, means for rotating the air gaps and their associated magnetic fields about the axis, means defining two separate arcuate flow paths for substantially equal portions of the gaseous mixture, said flow paths being symmetryically disposed on opposite sides of said axis in the path of the air gaps when those gaps are rotated, means for locally heating the mixture in difined portions of each flow path to provide two temperature differential junctions therein, the junctions in one flow path being substantially diametrically opposed to the corresponding junctions in the other flow path, and pressure responsive means connected to said separate flow paths for measuring pressure pulses produced in the gaseous mixture by the periodically varying magnetic fields at said junctions, said pressure pulses being in a direction from the cold to the hot side of each junction.

2. Apparatus according to claim 1, in which the means defining each flow path for a portion of the gaseous mixture include a tube bent in the form of a semi-circle with an inlet for the gaseous mixture at one end and an outlet for the mixture at the other end.

3. Apparatus in accordance with claim 1, in which the means defining the flow paths for the gaseous mixture include a tube in the form of a small bore ring with an inlet for the gaseous mixture at one side, a partition across the bore diametrically opposed to the inlet, and a separate outlet adjacent each side of the partition.

4. Apparatus in accordance with claim 3, in which said tube is made of metal having a high electrical resistance, and in which the means for locally heating the gaseous mixture flowing therein include a source of electrical energy connected across the ring at diametrically opposite points substantially midway between the inlet and the partition and also include electrically and thermally conductive metal supports engaging the ring over diametrically opposite arcs, one of said arcs being adjacent to and symmetrical with the inlet and the other of said arcs being adjacent to and symmetrical with the partition, said conductive supports acting as electrical shunts for the engaged portions of the ring to minimize resistive heating of those portions and also acting as thermal conductors for dissipating heat from the engaged portions of the ring.

5. Apparatus for measuring the concentration of a paramagnetic gas in a gaseous mixture, comprising a small bore ring tube, an inlet in the wall of the tube for introducing the gaseous mixture, a partition across the bore of the tube at a point diametrically opposite the inlet, a separate outlet in the wall of the tube on each side of the partition and immediately adjacent thereto, means for heating the tube locally over substantially diametrically opposite arcs between and substantially symmetrical with the inlet and the partition, means for producing two substantially identical magnetic fields of non-uniform distribution symmetrically disposed about an axis of revolution that passes through the center of the ring and intersecting the tube at diametrically opposite points, means for rotating said magnetic fields about said axis of revolution, and means for measuring the periodical variations of the pressure differences between portions of the gaseous mixture flowing through the tube.

6. Apparatus according to claim 5, in which the ring tube is made of metal having a high electrical resistance and in which the means for locally heating the ring tube include a source of electrical energy connected across the ring tube at diametrically opposite points substantially midway between the inlet and the partition.

7. Apparatus according to claim 5, in which the ring tube is additionally provided with thermally conductive metal supports that engage the ring tube over substantially diametrically opposite arcs, one of said arcs being adjacent to and symmetrical with the inlet and the other of said arcs being adjacent to and symmetrical with the partition.

8. Apparatus for measuring the concentration of a paramagnetic gas in a gaseous mixture, comprising means for producing substantially identical magnetic fields of non-uniform distribution across two spaced air gaps symmetrically disposed about a given axis, means for rotating the air gaps and their associated magnetic fields about the axis, means defining two separate flow paths for substantially equal portions of the gaseous mixture, said flow paths being symmetrically disposed on opposite sides of said axis in the path of the air gaps when those gaps are rotated, means for locally heating the mixture in a defined portion of each flow path to provide a temperature differential junction therein that is substantially diametrically opposed to a junction in the other flow path, thereby to produce simultaneous pressure pulses in the gaseous mixture by the periodically varying magnetic fields at each junction, said pulses being in a direction from the cold to the hot side of each junction, means for measuring those pressure pulses, and each of said junctions having a temperature gradient in the direction of movement of the air gaps when those gaps are rotated and being so connected to the measuring means that pressure pulses produced at each junction will be in phase and will reinforce each other at the measuring means.

9. Apparatus for measuring the concentration of a paramagnetic gas in a gaseous mixture comprising means for producing two substantially identical magnetic fields of non-uniform distribution across two spaced air gaps symmetrically disposed about a given axis, means for rotating the air gaps and their associated magnetic fields about the axis, means defining two separate arcuate flow paths for substantially equal portions of the gaseous mixture, said flow paths being symmetrically disposed on opposite sides of said axis in the path of the air gaps and magnetic fields when those gaps and fields are rotated, means for locally heating the mixture in defined portions of each flow path to provide two temperature differential junctions therein, each junction in one flow path being substantially diametrically opposed to a different one of the two junctions in the other flow path, thereby to generate a pressure pulse in the gaseous mixture in each flow path simultaneously and in a direction from the cold to the hot side of the junction therein as opposed junctions are traversed simultaneously by magnetic fields, and pressure responsive means for measuring such simultaneous pressures pulses so connected to the flow passages that a pressure pulse generated in one flow path will reinforce the response of said means to the simultaneous pressure pulse generated in the other flow path.

References Cited by the Examiner
UNITED STATES PATENTS
2,696,731   12/54   Luft _____ 73—23

RICHARD C. QUEISSER, *Primary Examiner.*